(12) United States Patent
Fan et al.

(10) Patent No.: US 12,319,778 B2
(45) Date of Patent: Jun. 3, 2025

(54) POLYURETHANE COMPOSITIONS, PRODUCTS PREPARED WITH SAME AND PREPARATION METHODS THEREOF

(71) Applicant: Dow Global Technologies LLC, Midland, MI (US)

(72) Inventors: Yanbin Fan, Shanghai (CN); Hongyu Chen, Zhangjiang (CN); Jianqing Jiao, Shanghai (CN); Huan Chen, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 679 days.

(21) Appl. No.: 17/596,327

(22) PCT Filed: Jul. 22, 2019

(86) PCT No.: PCT/CN2019/097011
§ 371 (c)(1),
(2) Date: Dec. 7, 2021

(87) PCT Pub. No.: WO2021/012139
PCT Pub. Date: Jan. 28, 2021

(65) Prior Publication Data
US 2022/0315690 A1  Oct. 6, 2022

(51) Int. Cl.
*C08G 18/40* (2006.01)
*C08G 18/10* (2006.01)
(Continued)

(52) U.S. Cl.
CPC ......... *C08G 18/4072* (2013.01); *C08G 18/10* (2013.01); *C08G 18/3206* (2013.01);
(Continued)

(58) Field of Classification Search
CPC ................ C08G 10/4072; C08G 10/10; C08G 10/3206; C08G 10/3275; C08G 10/4238;
(Continued)

(56) References Cited

U.S. PATENT DOCUMENTS

| 4,904,706 A | 2/1990 | Uenishi et al. |
| 2004/0082677 A1* | 4/2004 | Michels ............. C08G 18/4252 528/66 |

(Continued)

FOREIGN PATENT DOCUMENTS

| CN | 104479102 A | 4/2015 |
| CN | 105949434 A | 9/2016 |

(Continued)

OTHER PUBLICATIONS

PCT/CN2019/097011 Search Report and Written Opinion with a mailing date of Apr. 22, 2020.

(Continued)

*Primary Examiner* — Michael M. Bernshteyn (57) ABSTRACT

A polyurethane composition is provided. The polyurethane composition comprises (A) a polyurethane-prepolymer prepared by reacting at least one polyisocyanate compound with a first polyol component; and (B) a second polyol component; wherein at least one of the first polyol component and the second polyol component comprises an ester/ether random copolymer polyol synthesized by reacting a starting material polyether polyol with at least one monomeric polyhydric alcohol and at least one monomeric multifunctional carboxylic acid or anhydride thereof. The polyurethane foam prepared by using the polyurethane composition can achieve inhibited internal heat buildup, high thermal stability, superior tear strength, enhanced abrasion resistance and good hydrolysis resistance. A polyurethane product prepared with said foam, a method for preparing the polyurethane foam and a method for improving (Continued)

the performance property of the polyurethane foam are also provided.

9 Claims, 1 Drawing Sheet

(51) Int. Cl.
| | |
|---|---|
| *C08G 18/32* | (2006.01) |
| *C08G 18/42* | (2006.01) |
| *C08G 18/48* | (2006.01) |
| *C08G 18/63* | (2006.01) |
| *C08G 18/72* | (2006.01) |
| *C08G 18/76* | (2006.01) |
| *C08G 18/79* | (2006.01) |
| *C08J 9/02* | (2006.01) |

(52) U.S. Cl.
CPC ..... *C08G 18/3275* (2013.01); *C08G 18/4238* (2013.01); *C08G 18/4252* (2013.01); *C08G 18/4854* (2013.01); *C08G 18/632* (2013.01); *C08G 18/725* (2013.01); *C08G 18/7671* (2013.01); *C08G 18/797* (2013.01); *C08J 9/02* (2013.01); *C08G 2110/0083* (2021.01); *C08J 2375/08* (2013.01)

(58) Field of Classification Search
CPC ............ C08G 10/4252; C08G 10/4854; C08G 10/632; C08G 10/735; C08G 10/7671; C08G 10/797; C08G 2110/0083; C08J 9/02; C08J 2375/08

USPC ......................................................... 521/159
See application file for complete search history.

(56) References Cited

U.S. PATENT DOCUMENTS

| | | |
|---|---|---|
| 2004/0220290 A1 | 11/2004 | Grimm et al. |
| 2005/0197413 A1* | 9/2005 | Grimm ...................... C08J 9/32 |
| | | 521/50 |
| 2016/0304657 A1 | 10/2016 | Albers et al. |
| 2019/0211136 A1* | 7/2019 | Hasegawa ............ C08G 18/757 |

FOREIGN PATENT DOCUMENTS

| | | | |
|---|---|---|---|
| CN | 106800636 A | 6/2017 | |
| CN | 108503780 A | 9/2018 | |
| JP | 46028425 B | 3/1967 | |
| JP | 2000038432 A | 2/2000 | |
| JP | 2011241336 A | 12/2011 | |
| WO | WO-2015033734 A1 * | 3/2015 | ............ C08G 18/10 |
| WO | 2015061032 A1 | 4/2015 | |

OTHER PUBLICATIONS

Office Action from corresponding 2022-502821 Japanese application, mailed Jun. 14, 2023.

* cited by examiner

POLYURETHANE COMPOSITIONS, PRODUCTS PREPARED WITH SAME AND PREPARATION METHODS THEREOF

FIELD OF THE INVENTION

The present disclosure relates to a polyurethane composition, a polyurethane foam and a molded product prepared by using the composition, a method for preparing the polyurethane foam and a method for improving the performance properties of the polyurethane foam. The polyurethane composition exhibits decreased viscosity, and the polyurethane foam exhibits excellent properties such as inhibited internal heat buildup, high thermal stability, superior tear strength, enhanced abrasion resistance and good hydrolysis resistance.

BACKGROUND TECHNOLOGY

Microcellular polyurethane foams are foamed polyurethane materials with a density of about 100-900 kg/m$^3$ and are usually fabricated via a two-component process comprising the steps of reacting a first component mainly comprising polyols and optional additives such as foaming agents, catalysts, surfactants, etc. with a second component which comprises a polyurethane-prepolymer obtained by reacting polyols with polyisocyanates. The two components are blended at high speed and then transferred into varied molds with desired shapes. Over the past decades, microcellular polyurethane foams have been employed in a wide range of end use applications like shoemaking (e.g., soles) and automotive industries (e.g., bumpers and arm rests of integral skin foams). Recently, microcellular polyurethane foams have been explored in solid tire applications. These microcellular polyurethane solid tires have been attractive due to elimination of deflation risk that all the pneumatic rubber tires inherently possess and may bring about potential safety issues and increased maintenance costs.

The uses of polyurethane in tire applications have been challenging due to inherent attributes of polyurethanes to generate "internal heat". The internal heat buildup originates from transition of mechanical energy into heat inside polyurethanes and is characterized by significant augmentation of the tire temperature during rolling especially under high speed and load. With increasing temperature, material failures including fatigue cracking and/or melting are usually observed. Thus the upper limits of speed and load under which a polyurethane tire can operate are determined by internal heat buildup, and of course, thermal stability of the polyurethane tire. Significant efforts have been made to increase the thermal stability of polyurethanes by introduction of functional moieties e.g. isocyanurate, oxazolidone, oxamide or borate groups or to reduce the "internal heat buildup" in polyurethanes by using special isocyanates like 1,5-naphthylene diisocyanate. However, the above indicated modification by using the chemicals with special groups or special isocyanates are usually too expensive to be commercialized.

Notably, it was reported that formulations based on mixtures of polyester and polyether polyols were good candidates for manufacturing the polyurethane solid tires. These tires showed good modality, abrasion-resistance, puncture-resistance, high resilience, and low compression set. However, blends of polyether polyols and polyester polyols tend to bring about disadvantages in processing properties like short operation time due to segmentation and deteriorated performance balance between tear strength, internal heat buildup and thermal-stability, which might be attributed to the incompatibility nature between polyether and polyester structures.

For the above reasons, there is still a need in the polyurethane manufacture industry to develop a polyurethane composition whose performance properties as stated above can be improved with an economical way. After persistent exploration, the inventors have surprisingly developed a polyurethane composition which can achieve one or more of the above targets.

SUMMARY OF THE INVENTION

The present disclosure provides a novel polyurethane composition, a polyurethane foam and a molded product prepared by using the composition, a method for preparing the polyurethane foam and a method for improving the performance properties of the polyurethane foam.

In a first aspect of the present disclosure, the present disclosure provides a polyurethane composition, comprising
(A) at least one polyurethane-prepolymer prepared by reacting at least one polyisocyanate compound with a first polyol component; and
(B) a second polyol component;
wherein at least one of the first polyol component and the second polyol component comprises an ester/ether random copolymer polyol synthesized by reacting a starting material polyether polyol with at least one monomeric polyhydric alcohol comprising from 2 to 12 carbon atoms and having a hydroxyl functionality of 1.5-3.0 and at least one monomeric multifunctional carboxylic acid or anhydride thereof comprising from 2 to 20 carbon atoms and having a carboxylic acid functionality of 1.5-3.0. According to a preferable embodiment of the present disclosure, the starting material polyether polyol used for making the ester/ether random copolymer polyol is a poly($C_2$-$C_{10}$)alkylene glycol or a copolymer of multiple ($C_2$-$C_{10}$)alkylene glycols. For example, the starting material polyether polyol can be select from the group consisting of (i) polytetramethylene glycol having a molecular weight of 200-3,000 g/mol and a hydroxyl functionality of 1.5-3.0; (ii) polyether polyol based on one or more of ethylene oxide, 1,2-propylene oxide, 1,2-butylene oxide, and 2,3-butylene oxide, having a molecular weight of 200-3,000 g/mol and a hydroxyl functionality of 1.5-3.0; and a combination thereof. According to another preferable embodiment, the monomeric polyhydric alcohol is selected from the group consisting of ethylene glycol, 1,2-propanediol, 1,3-propanediol, 1,2-butanediol, 1,3-butanediol, 1,4-butenediol, 1,4-butynediol, 1,5-pentanediol, neopentyl glycol, 1,4-bis(hydroxymethyl)cyclohexane, 1,2-bis(hydroxymethyl)cyclohexane, 1,3-bis(hydroxymethyl)-cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols; and the monomeric multifunctional carboxylic acid or anhydride thereof is selected from the group consisting of suberic acid, azelaic acid, adipic acid, phthalic acid, isophthalic acid, phthalic anhydride, tetrahydrophthalic anhydride, hexahydrophthalic anhydride, tetrachlorophthalic anhydride, endomethylene-tetrahydro-phthalic anhydride, glutaric anhydride, alkenylsuccinic acid, maleic acid, maleic anhydride, fumaric acid and dimeric fatty acids. According to another preferable embodiment of the present disclosure, the ester/ether random copolymer polyol has a molecular weight of 800 to 6,000 g/mol and an average hydroxyl functionality of 1.5 to 3.0, and the weight ratio between ether segment and ester segment in the ester/ether random copolymer polyol is from 0.05/0.95 to 0.95/0.05.

In a second aspect of the present disclosure, the present disclosure provides a microcellular polyurethane foam prepared with the polyurethane composition as stated above, wherein repeating units derived from the ester/ether random copolymer polyol are covalently linked in polyurethane main chain of the polyurethane microcellular polyurethane foam, and the microcellular polyurethane foam has a density of 100-900 kg/m$^3$.

In a third aspect of the present disclosure, the present disclosure provides a molded product prepared with the above indicated microcellular polyurethane foam, wherein the molded product is selected from the group consisting of tire, footwear, sole, furniture, pillow, cushion, toy and lining.

In a fourth aspect of the present disclosure, the present disclosure provides a method for preparing the microcellular polyurethane foam, comprising the steps of:
  i) reacting at least one polyisocyanate compound with a first polyol component to form the polyurethane-prepolymer; and
  ii) reacting polyurethane-prepolymer with a second polyol component to form the microcellular polyurethane foam;
  repeating units derived from the ester/ether random copolymer polyol are covalently linked in polyurethane main chain of the polyurethane microcellular polyurethane foam.

In a fifth aspect of the present disclosure, the present disclosure provides a method for improving the performance property of a microcellular polyurethane foam, comprising the step of covalently linking repeating units derived from the above stated ester/ether random copolymer polyol in the polyurethane main chain of the polyurethane microcellular polyurethane foam, wherein the ester/ether random copolymer polyol is synthesized by reacting a starting material polyether polyol with at least one monomeric polyhydric alcohol comprising from 2 to 12 carbon atoms and having a hydroxyl functionality of 1.5-3.0 and at least one monomeric multifunctional carboxylic acid or anhydride thereof comprising from 2 to 20 carbon atoms and having a carboxylic acid functionality of 1.5-3.0; and the performance property includes at least one of internal heat buildup, thermal stability, tear strength, viscosity, abrasion resistance and hydrolysis resistance.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated. Unless indicated otherwise, all the percentages and ratios are calculated based on weight, and all the molecular weights are number average molecular weights. In the context of the present disclosure, the ester/ether random copolymer polyol derived from the condensation polymerization reaction of the starting material polyether polyol with the $C_2$-$C_{12}$ monomeric polyhydric alcohol and the $C_2$-$C_{20}$ monomeric multifunctional carboxylic acid or anhydride thereof is referred as "the ester/ether random copolymer polyol" for short.

According to an embodiment of the present disclosure, the polyurethane composition is a "two-component", "two-part" or "two-package" composition comprising at least one polyurethane-prepolymer component (A) and an isocyanate-reactive component (B), wherein the polyurethane-prepolymer comprises free isocyanate groups and is prepared by reacting at least one polyisocyanate compound with a first polyol component, and the isocyanate-reactive component (B) is a second polyol component. The polyurethane-prepolymer component (A) and the isocyanate-reactive component (B) are transported and stored separately, combined shortly or immediately before being applied during the manufacture of the polyurethane product, such as solid tire. Once combined, the isocyanate groups in component (A) reacts with the isocyanate-reactive groups (particularly, hydroxyl group) in component (B) to form polyurethane. Without being limited to any specific theory, it is believed that an ester/ether random copolymer polyol derived from the reaction of starting material polyether polyols, the $C_2$-$C_{12}$ monomeric polyhydric alcohol and the $C_2$-$C_{20}$ monomeric multifunctional carboxylic acid or anhydride thereof is included in at least one of the first polyol component and the second polyol component to incorporate repeating units (residual moiety) of said ester/ether random copolymer polyol in the polyurethane main chain of the final polyurethane foam, thus the performance properties of the polyurethane foam can be effectively improved. According to one embodiment of the present disclosure, the first polyol component comprises the ester/ether random copolymer polyol derived from the reaction of the starting material polyether polyol, the $C_2$-$C_{12}$ monomeric polyhydric alcohol and the $C_2$-$C_{20}$ monomeric multifunctional carboxylic acid or anhydride thereof, while the second polyol component does not. According to an alternative embodiment of the present disclosure, the second polyol component comprises the ester/ether random copolymer polyol derived from the reaction of starting material polyether polyols, the $C_2$-$C_{12}$ monomeric polyhydric alcohol and the $C_2$-$C_{20}$ monomeric multifunctional carboxylic acid or anhydride thereof, while the first polyol component does not. According to an alternative embodiment of the present disclosure, both the first and the second polyol component comprise the ester/ether random copolymer polyol derived from the reaction of starting material polyether polyols, the $C_2$-$C_{12}$ monomeric polyhydric alcohol and the $C_2$-$C_{20}$ monomeric multifunctional carboxylic acid or anhydride thereof. The ester/ether random copolymer polyol is prepared by a condensation polymerization (esterification reaction) between the carboxyl groups in the $C_2$-$C_{20}$ monomeric multifunctional carboxylic acid or anhydride thereof and the hydroxyl groups contained in the starting material polyether polyols and the $C_2$-$C_{12}$ monomeric polyhydric alcohol. It is to be particularly emphasized that the inclusion of such an ester/ether random copolymer polyol moiety in the polyurethane main chain has not been disclosed in the prior art. For example, due to the high reactivity between the isocyanate group and the isocyanate-reactive group, the reaction between the polyisocyanate compound and e.g. a polyether polyol/polyester polyol physical blend can never form the above indicated residual moiety of the ester/ether random copolymer polyol of the present disclosure.

In various embodiments, the starting material polyether polyol used for preparing the ester/ether random copolymer polyol has a molecular weight of 100 to 3,000 g/mol, and preferably from 200 to 2,000 g/mol. For example, the ester/ether random copolymer polyol may have a molecular weight in the numerical range obtained by combining any two of the following end point values: 200, 250, 300, 350, 400, 450, 500, 550, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900 and 3000 g/mol. In various embodiments, the starting material polyether polyol used for preparing the ester/ether random copolymer polyol has an average hydroxyl functionality of 1.5 to 3.0, and may have an average hydroxyl functionality in the numerical range obtained by combining any two of the following end point values: 1.6, 1.7, 1.8, 1.9, 2.0, 2.1, 2.2, 2.3, 2.4, 2.5, 2.6, 2.7, 2.8, 2.9 and 3.0. According to a preferable embodiment of the present disclosure, the starting material polyether polyol for making the ester/ether random copolymer polyol is selected from the group consisting of polyethylene glycol, polypropylene glycol, polytetramethylene glycol, poly(2-methyl-1,3-propane glycol) and any copolymers thereof, such as poly(ethylene oxide-propylene oxide) glycol.

According to a particularly preferable embodiment of the present disclosure, the starting material polyether polyol is select from the group consisting of (i) polytetramethylene glycol having a molecular weight of 200-3,000 g/mol and a hydroxyl functionality of 1.5-3.0; (ii) polyether polyol based on one or more of ethylene oxide, 1,2-propylene oxide, 1,2-butylene oxide, and 2,3-butylene oxide, having a molecular weight of 200-3,000 g/mol and a hydroxyl functionality of 1.5-3.0; and a combination thereof. According to a most preferable embodiment of the present disclosure, the starting material polyether polyol used for preparation of the ester/ether random copolymer polyol is a polytetramethylene glycol having a molecular weight of 200-3,000 g/mol and a hydroxyl functionality of 1.5-3.0.

According to an embodiment of the present disclosure, the above stated starting material polyether polyols can be prepared by polymerization of one or more linear or cyclic alkylene oxides selected from propylene oxide (PO), ethylene oxide (EO), butylene oxide, tetrahyfrofuran, 2-methyl-1,3-propane glycol and mixtures thereof, with proper starter molecules in the presence of a catalyst. Typical starter molecules include compounds having at least 1, preferably from 1.5 to 3.0 hydroxyl groups or having 1 or more primary amine groups in the molecule. Suitable starter molecules having at least 1 and preferably from 1.5 to 3.0 hydroxyl groups in the molecules are for example selected from the group comprising ethylene glycol, 1,2-propanediol, 1,3-propanediol, 1,2-butanediol, 1,3-butanediol, 1,4-butenediol, 1,4-butynediol, 1,5-pentanediol, neopentyl glycol, 1,4-bis(hydroxymethyl)-cyclohexane, 1,2-bis(hydroxymethyl)cyclohexane, 1,3-bis(hydroxymethyl)-cyclohexane, 2-methyl-propane-1,3-diol, methylpentanediols, diethylene glycol, triethylene glycol, tetraethylene glycol, polyethylene glycol, dipropylene glycol, polypropylene glycol, dibutylene glycol, polybutylene glycols, trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. By way of starter molecules having 1 or more primary amine groups in the molecules are selected for example from the group consisting of aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. Catalysts for the preparation of starting material polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the starting material polyether polyol include polyethylene, (methoxy)polyethylene glycol (MPEG), polyethylene glycol (PEG), poly(propylene glycol), polytetramethylene glycol, poly(2-methyl-1,3-propane glycol) or copolymer of ethylene epoxide and propylene epoxide (polyethylene glycol-propylene glycol) with primary hydroxyl ended group or secondary hydroxyl ended group.

In various embodiments, the monomeric polyhydric alcohol is selected from the group consisting of ethylene glycol, 1,2-propanediol, 1,3-propanediol, 1,2-butanediol, 1,3-butanediol, 1,4-butenediol, 1,4-butynediol, 1,5-pentanediol, neopentyl glycol, 1,4-bis(hydroxymethyl)-cyclohexane, 1,2-bis(hydroxymethyl)cyclohexane, 1,3-bis(hydroxymethyl)-cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols; and the monomeric multifunctional carboxylic acid is independently selected from the group consisting of suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydro-phthalic anhydride, glutaric anhydride, alkenylsuccinic acid, maleic acid, maleic anhydride, fumaric acid and dimeric fatty acids.

According to a preferable embodiment, the starting material polyether polyol is the only reactant reacting with the monomeric polyhydric alcohol and the monomeric multifunctional carboxylic acid, and no other polymeric reactants, such as polyester polyol are included in the system for preparing the ester/ether random copolymer polyol. Particularly speaking, the reaction of the starting material polyether polyol, the monomeric polyhydric alcohol and the monomeric multifunctional carboxylic acid or anhydride thereof will form a copolymer exclusively comprising repeating units derived from the above indicated reactants.

A catalyst can be used in the production of the ester/ether random copolymer polyol. Examples of the catalyst may include p-toluenesulfonic acid; titannium (IV) based catalyst such as such as tetraisopropyl titanate, tetra(n-butyl) titanate, tetraoctyl titanate, titanium acetic acid salts, titanium diisopropoxybis(acetylacetonate), and titanium diisopropoxybis (ethyl acetoacetate); zirconium-based catalyst such as zirconium tetraacetylacetonate, zirconium hexafluoroacetylacetonate, zirconium trifluoroacetylacetonate, tetrakis (ethyltrifluoroacetyl-acetonate) zirconium, tetrakis(2,2,6,6- tetramethyl-heptanedionate), zirconium dibutoxybis (ethylacetoacetate), and zirconium diisopropoxybis (2, 2, 6, 6-tetramethyl-heptanedionate); and tin (II) and tin (IV)-based catalysts such as tin diacetate, tin dioctanoate, tin diethylhexanoate, tin dilaurate, dibutyltin diacetate, dibutyltin dilaurate, dibutyltin maleate, dioctyltin diacetate, dimethyltin dineodecanoate, dimethylhydroxy (oleate) tin, and dioctyldilauryltin.

According to an embodiment of the present disclosure, the ester/ether random copolymer polyol prepared by the reaction of the starting material polyether polyol, the monomeric polyhydric alcohol and the monomeric multifunctional carboxylic acid or anhydride thereof can have a molecular weight of at least 800 g/mol, such as from 800 g/mol to 6,000 g/mol. The ester/ether random copolymer polyol of the present disclosure comprises "polyether moiety" derived from the starting material polyether polyol and "polyester moiety" derived from the reactions between the carboxyl group of the monomeric multifunctional carboxylic acid or anhydride thereof and the free hydroxyl groups contained in the monomeric polyhydric alcohol and the starting material polyether polyol. According to an embodiment of the present disclosure, the weight ratio between the polyether moiety and the polyester moiety is from 0.05/0.95 to 0.95/0.05, preferably from 0.25/0.75 to 0.75/0.25. The weight ratio can be properly adjusted according to the particular functionality and molecular weight of these reactants, with the proviso that the resultant ester/ether random copolymer polyol comprises more than one free hydroxyl groups and has an average hydroxyl functionality of 1.5 to 3.0, such as 1.5-2.0. For example, the ester/ether random copolymer polyol may have an average hydroxyl functionality in the numerical range obtained by combining any two of the following end point values: 1.5, 1.6, 1.7, 1.8, 1.9, 2.0, 2.1, 2.2, 2.3, 2.4, 2.5, 2.6, 2.7, 2.8, 2.9 and 3.0. According to another embodiment of the present disclosure, the ester moiety/block is present in the polyurethane at an amount of 1.0 wt % to 52 wt %, and the polyether moiety/block is present in the polyurethane at an amount of 1.0 wt % to 70 wt %, based on the total weight of the resultant polyurethane.

In various embodiments, the polyisocyanate compound refers to an aliphatic, cycloaliphatic, aromatic or heteroaryl compound having at least two isocyanate groups. In a preferable embodiment, the polyisocyanate compound can be selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof. Generally, the amount of the polyisocyanate compound may vary based on the actual requirement of the polyurethane foam and the polyurethane tire. For example, as one illustrative embodiment, the content of the polyisocyanate compound can be from 15 wt % to 60 wt %, or from 20 wt % to 50 wt %, or from 23 wt % to 40 wt %, or from 25 wt % to 35 wt %, based on the total weight of the polyurethane composition. According to a preferable embodiment of the present disclosure, the amount of the polyisocyanate compound is properly selected so that the isocyanate group is present at a stoichiometric molar amount relative to the total molar amount of the hydroxyl groups included in the first polyol component, the second polyol component, and any additional additives or modifiers.

Additionally or alternatively, the first polyol component and the second polyol component may comprise a polyol other than the ester/ether random copolymer polyol (hereinafter referred as "polyol" for short). According to an embodiment of the present application, the first polyol component exclusively comprises the ester/ether random copolymer polyol while the second polyol component comprises the polyol. According to another embodiment of the present application, the second polyol component exclusively comprises the ester/ether random copolymer polyol while the first polyol component comprises the polyol. According to another embodiment of the present application, both the first and the second polyol component exclusively comprise the ester/ether random copolymer polyol and do not comprise any other polyol as the reactants. According to another embodiment of the present application, the first polyol component comprises the ester/ether random copolymer polyol and the polyol, while the second polyol component comprises the polyol. According to another embodiment of the present application, the second polyol component comprises the ester/ether random copolymer polyol and the polyol, while the first polyol component comprises the polyol. According to another embodiment of the present application, the second polyol component comprises the ester/ether random copolymer polyol and the polyol, and the first polyol component comprises the ester/ether random copolymer polyol and the polyol. According to a preferable embodiment of the present disclosure, residual moiety of polytetramethylene glycol is covalently linked in the main chain of the resultant polyurethane. The residual moiety of polytetramethylene glycol may be derived from the polytetramethylene glycol used for preparing the ester/ether random copolymer polyol, derived from the polyol other than the ester/ether random copolymer polyol, or a combination thereof. According to a particularly preferable embodiment of the present disclosure, the residual moiety of polytetramethylene glycol may be present in the resultant polyurethane main chain at an amount of 1.0 wt % to 70 wt %, preferably 5.0 wt % to 35 wt %, based on the total weight of the polyurethane.

According to various embodiments of the present application, the polyol other than the ester/ether random copolymer polyol can be selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 3,000 and an average hydroxyl functionality of 1.5 to 5.0, a polymer polyol having a core phase and a shell phase based on polyol, having a solid content of 1-50%, an OH value 10-149, and a hydroxyl functionality of 1.5-5.0, a supplemental polyether polyol which is a poly ($C_2$-$C_{10}$)alkylene glycol or a copolymer of multiple ($C_2$-$C_{10}$)alkylene glycols, and combinations thereof; wherein the supplemental polyether polyol can be identical with or different from the starting material polyether polyol. According to a preferable embodiment of the present application, the polyol other than the ester/ether random copolymer polyol can be selected from the group consisting of polyethylene glycol, polypropylene glycol and polytetramethylene glycol. In the context of the present disclosure, the above stated polymer polyol refers to a composite particulate having a core-shell structure. The shell phase may comprise at least one polyol other than the ester/ether random copolymer polyol, for example, the polyol may be selected from the group consisting of polyethylene, (methoxy)polyethylene glycol (MPEG), polyethylene glycol (PEG), poly(propylene glycol), polytetramethylene glycol, poly(2-methyl-1,3-propane glycol) or copolymer of ethylene epoxide and propylene epoxide (polyethylene glycol-propylene glycol) with primary hydroxyl ended group or secondary hydroxyl ended group. The core phase may be micro-sized and may comprise any polymers compatible with the shell phase. For example, the core phase may comprise polystyrene, polyacrylnitrile, polyester, polyolefin or polyether different (in either composition or polymerization degree) from those of the shell phase. According to a preferable embodiment of the present application, the polymer polyol is a composite particulate having a core-shell structure, wherein the core is a micro-sized core composed of SAN (styrene and acryl nitrile) and the shell phase is composed of PO-EO polyol. Such a polymer polyol can be prepared by radical copolymerization of styrene, acryl nitrile and poly(EO-PO) polyol comprising ethylenically unsaturated groups.

The polyurethane-prepolymer prepared by reacting the polyisocyanate compound with the first polyol component has a NCO group content of from 2 to 50 wt %, preferably from 6 to 49 wt %.

The reaction between the polyisocyanate compound and the first polyol component, and the reaction between the polyurethane-prepolymer and the second polyol component may occur in the presence of one or more catalysts that can promote the reaction between the isocyanate group and the hydroxyl group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N,N',N"-tris(dimethyl amino-propyl)sym-hexahydro triazine, or mixtures thereof.

In general, the content of the catalyst used herein is larger than zero and is at most 3.0 wt %, preferably at most 2.5 wt %, more preferably at most 2.0 wt %, based on the total weight of the polyurethane composition.

In various embodiments of the present disclosure, the polyurethane composition comprises one or more additives selected from the group consisting of chain extenders, cross-linkers, blowing agents, foam stabilizers, tackifiers, plasticizers, rheology modifiers, antioxidants, fillers, colorants, pigments, water scavengers, surfactants, solvents, diluents, flame retardants, slippery-resistance agents, antistatic agents, preservatives, biocides, antioxidants and combinations of two or more thereof. These additives can be transmitted and stored as independent components and incorporated into the polyurethane composition shortly or immediately before the combination of components (A) and (B). Alternatively, these additives may be contained in either of components (A) and (B) when they are chemically inert to the isocyanate group or the isocyanate-reactive group.

A chain extender may be present in the reactants that form the polyurethane foam. A chain extender is a chemical having two isocyanate-reactive groups per molecule and an equivalent weight per isocyanate-reactive group of less than 300, preferably less than 200 and especially from 31 to 125. The isocyanate reactive groups are preferably hydroxyl, primary aliphatic or aromatic amino or secondary aliphatic or aromatic amino groups. Representative chain extenders include ethylene glycol, diethylene glycol, triethylene glycol, 1,2-propylene glycol, dipropylene glycol, tripropylene glycol, 1,4-butanediol, cyclohexane dimethanol, ethylene diamine, phenylene diamine, bis(3-chloro-4-aminophenyl) methane, dimethylthio-toluenediamine and diethyltoluenediamine.

One or more cross-linkers also may be present in the reactants that form the polyurethane foam. For purposes of this invention, "cross-linkers" are materials having three or more isocyanate-reactive groups per molecule and an equivalent weight per isocyanate-reactive group of less than 300. Cross-linkers preferably contain from 3 to 8, especially from 3 to 4 hydroxyl, primary amine or secondary amine groups per molecule and have an equivalent weight of from 30 to about 200, especially from 50 to 125. Examples of suitable cross-linkers include diethanol amine, monoethanol amine, triethanol amine, mono-, di- or tri-(isopropanol) amine, glycerine, trimethylol propane, pentaerythritol, and the like.

Chain extenders and cross-linkers are suitably used in small amounts, as hardness increases as the amount of either of these materials increases. From 0 to 25 parts by weight of a chain extender is suitably used per 100 parts by weight of the polyol component. A preferred amount is from 1 to 15 parts per 100 parts by weight of the polyol component. From 0 to 10 parts by weight of a cross-linker is suitably used per 100 parts by weight of the polyol component. A preferred amount is from 0 to 5 parts per 100 parts by weight of the polyol component.

A filler may be present in the polyurethane composition. Fillers are mainly included to reduce cost. Particulate rubbery materials are especially useful fillers. Such a filler may constitute from 1 to 50% or more of the weight of the polyurethane composition.

Suitable blowing agents include water, air, nitrogen, argon, carbon dioxide and various hydrocarbons, hydrofluorocarbons and hydrochlorofluorocarbons. A surfactant may be present in the reaction mixture. It can be used, for example, if a cellular tire filling is desired, as the surfactant stabilizes a foaming reaction mixture until it can harden to form a cellular polymer. A surfactant also may be useful to wet filler particles and thereby help disperse them into the reactive composition and the elastomer. Silicone surfactants are widely used for this purpose and can be used here as well. The amount of surfactant used will in general be between 0.02 and 1 part by weight per 100 parts by weight polyol component.

The invention is applicable to prepare a material for a wide range of tires that can be used in many applications. The tires can be, for example, for a bicycle, a cart such as a golf cart or shopping cart, a motorized or unmotorized wheelchair, an automobile or truck, any other type of transportation vehicles including an aircraft, as well as various types of agriculture, industrial and construction equipment. Large tires that have an internal volume of 0.1 cubic meter or more are of particular interest.

According to various embodiments of the present disclosure, the polyurethane foam has a density of at least 100 kg/m$^3$, such as from 100 to 950 kg/m$^3$, from 200 to 850 kg/m$^3$, from 300 to 800 kg/m$^3$, from 400 to 750 kg/m$^3$, from 500 to 700 kg/m$^3$, from 550 to 650 kg/m$^3$, or from 580 to 620 kg/m$^3$, or about 600 kg/m$^3$.

According a preferable embodiment of the present disclosure, the polyurethane composition is substantially free of water or moisture intentionally added therein. For example, "free of water" or "water free" means that the mixture of all the raw materials used for preparing the polyurethane composition comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of water, based on the total weight of the mixture of raw materials.

According another preferable embodiment of the present disclosure, the polyurethane composition does not comprise modifying groups such as isocyanurate, oxazolidone, oxamide or borate groups covalently linked to the polyurethane main chain. According another preferable embodiment of the present disclosure, the polyurethane composition does not comprise special and expensive isocyanates such as 1,5-naphthylene diisocyanate. According to various aspects of the present application, improvement in the performance properties has been successfully achieved without the need of incorporating any special and expensive modifying functional groups in the polyurethane main chain.

EXAMPLES

Some embodiments of the invention will now be described in the following Examples. However, the scope of the present disclosure is not, of course, limited to the formulations set forth in these examples. Rather, the Examples are merely inventive of the disclosure.

The information of the raw materials used in the examples is listed in the following table 1:

TABLE 1

Raw materials used in the examples

| Components | Grades | Suppliers |
|---|---|---|
| Pure MDI | ISONATE M125 | Dow Chemical |
| Carbodiimide-modified MDI | Isonate 143LP | Dow Chemical |
| Carbodiimide-modified MDI | Isonate PR 7020 | Dow Chemical |
| Di-acid | Adipic acid, AA | Shenma Inc. |
| Esterification catalyst | n-Butyl titanate (TBT) | Merck Inc. |
| Inhibitor | Benzoyl Chloride | Daejung, Korea |
| Polyether polyol | Voranol CP 6001 | Dow Chemical |
| Polymer polyol | DNC 701 | Dow Chemical |
| Chain extender | 1,4-butane diol | BASF |
| Chain extender | Ethylene glycol | Shanghai Tony Trade Co., Ltd |
| Chain extender | Diethanolamine (DEOA) | Shanghai Tony Trade Co., Ltd |
| Polyether polyol | Polytetramethylene ether glycol 2000 | Dairen Chemical Corporate, Taiwan |
| Polyether polyol | Polytetramethylene ether glycol 1000 | Dairen Chemical Corporate, Taiwan |
| Polyether polyol | Polytetramethylene ether glycol 650 | BASF |
| Polybutadiene liquid polymer | Lithene N4-9000 | Synthomer Inc. |
| Foam stabilizer | Tegostab B-8408 | Evonik |
| Foam stabilizer | Dabco DC 193 | Evonik |
| Strong blowing catalyst | Niax A-1, 70% bis(dimethylamino-ethyl)ether and 30% DPG | Momentive |
| Balanced catalyst | Polycat 77, Bis(dimethylamino-propyl)methylamine | Evonik |
| Delayed catalyst, gelling and back cure | Dabco DC-1 | Evonik |
| Gelling catalyst | Fomrez UL-38 | Momentive |
| Dabco 33s | Dabco 33s, 33% TEDA diluted in 67% of 1,4-BDO | Evonik |

Characterization Technologies

Viscosities of different polyols and prepolymers were determined using viscosity analyzer (CAP, Brookfield) at various temperatures. Acid-value, hydroxyl-value and NCO value were determined according to ASTMD4662, ASTMD4274 and ASTM D5155, respectively. Tensile strength, elongation at break and tear strength were determined on a Gotech AI-7000S1 universal testing machine according to the testing method DIN 53543. Dynamic mechanical analysis (DMA) was performed on a TA RSA G2 analyzer under strain-control mode at a frequency of 1 Hz. Thermogravimetric analysis (TGA) was conducted on a TA-Q500 analyzer in a temperature range from 0° C. to 600° C. in air atmosphere. Differential scanning calorimeter (DSC) was performed on a TA Q1500 analyzer with a cooling speed of 10° C./min and heating speed of 20° C./min under N$_2$ atmosphere.

Preparation Examples 1-2: Synthesis of Ester/Ether Random Copolymer Polyols

Two Ester/ether random copolymer polyols according to the present disclosure, polyethylene polytetramethylene ether adipate (Mn=2000, PEPTMEA, Preparation Example 1) and polybutylene polytetramethylene ether adipate (Mn=2000, PBPTMEA, Preparation Example 2), and one control sample, polyethylene butylene adipate (Mn=2000, PEBA2000), were synthesized according to the following general procedure by using the recipes listed in Table 2.

Adipic acid (AA, 36.10 wt %), monoethylene glycol (MEG, 15.13 wt %) and polytetramethylene ether glycol 1000 (PTMEG1000, 48.77 wt %) were fed into a steel reactor equipped with a vacuum pump and oil bath under nitrogen atmosphere at room temperature. The system was kept at 180° C. with stirring for 4 h, then the reaction continued at 240° C. until the content within the reactor exhibited a n acid value of below 1.0 mg KOH/g (which needed about 14 h). n-Butyl titanate (TBT, 15 ppm in final product) was added into the system when water removal slowed down and vacuum (ca. 150 mbar) was also adopted to accelerate the reduction of acid values. The final product was cooled down to 80° C., filtered, drummed and sampled for the characterization of acid value, hydroxyl value, and viscosity determination. The products prepared in these two Preparation Examples 1-2 are referred as PEPTMEA and PBPTMEA, respectively. The product prepared in the control example was known as PEBA 2000. All the characterization results were also summarized in Table 2.

TABLE 2

Recipes and Characterization of the Synthesis of Ester/Ether Random Copolymer Polyols

|  | Control 1 PEBA2000 | PREP. Ex. 1 PEPTMEA | PREP. Ex. 2 PBPTMEA |
|---|---|---|---|
| Adipic acid (AA) | 62.39 | 36.10 | 35.50 |
| Methylene glycol (MEG) | 15.33 | 15.13 |  |
| 1,4-Butane diol (BDO) | 22.28 |  | 18.60 |
| PTMEG1000 |  | 48.77 |  |
| PTMEG650 |  |  | 54.40 |
| Acid Value (mg KOH/g) | 0.82 | 0.81 | 0.50 |
| Hydroxyl Value (mg KOH/g) | 55.90 | 55.80 | 56.88 |
| Viscosity (mPa · s, 50° C.) | 1668.00 | 1129.000 | 1014.00 |
| Tg (° C.) | −58.00 | −62.80 | −63.81 |
| ΔH (J/g) | 70.00 | 64.64 | 47.70 |

Polyester polyol polyethylene butylene adipate (Mn=2000, PEBA2000) was used as control sample in this invention, and the characterization results thereof are also listed in Table 2. It can be unexpectedly seen that PEPTMEA and PBPTMEA exhibit significantly lower viscosity, a potent indicative of good processability, as compared with the control sample. Furthermore, the products of the two inventive preparation examples also exhibit lower entropy changes (ΔH), indicating lower inclination of crystallization and better storage/processing stabilities.

Preparation Examples 3-5: Synthesis of Polyurethane-Prepolymer

Three different prepolymers were prepared by reacting the polyols prepared in the above examples as well as commercial available polyether polyol PTMEG2000 with MDI according to the following general procedure with the recipes shown in Table 3. MDI (ISONATE 125MH) and inhibitor (benzoyl chloride) were initially loaded into a tank reactor equipped with a vacuum pump and oil bath, and then were kept at a temperature of 60° C. with agitation. The polyol was preheated at 60° C. for 12 hours before being charged into the reactor. The reactor was kept at a temperature below 75° C. during the feeding of said polyols. The mixture was then heated to 80° C. and allowed to react for 150 min with stirring. Then the system was cooled down to 50° C., into which Isonate 143LP and Isonate PR 7020 were added and the content in the reactor was agitated for another 20 min. Final prepolymer products were obtained subsequently after quantification of NCO content and degassing under vacuum for 30 min. The resultant prepolymer has a NCO content of ca. 19 wt %. The characterization results were summarized in Table 3. Two carbodiimide-modified MDI, Isonate 143LP and Isonate PR7020 were incorporated in the prepolymers to improve their storage stability at low temperature.

TABLE 3

Recipes and Characterization of the Prepolymers.

|  | PREP. Ex. 3 Prepolymer-1 (Based on PEBA2000) | PREP. Ex. 4 Prepolymer-2 (Based on PTMEG2000) | PREP. Ex. 5 Prepolymer-3 (Based on PEPTMEA) |
|---|---|---|---|
| Isonate 125MH | 56.295 | 56.295 | 56.295 |
| Benzoyl Chloride | 0.005 | 0.005 | 0.005 |
| Isonate 143LP | 4.000 | 4.000 | 4.000 |
| Isonate PR 7020 | 2.500 | 2.500 | 2.500 |
| PEBA2000 | 37.200 |  |  |
| PTMEG2000 |  | 37.200 |  |
| PEPTMEA |  |  | 37.200 |
| NCO Content (wt %) | 19.000 | 19.060 | 19.150 |
| Viscosity (mPa · s, 25° C.) | 1266.000 | 901.000 | 1300.000 |

As shown in Table 3, the Prepolymer-2, which was based on pure PTMEG2000, showed the lowest viscosities at 25° C., which is a result of higher flexibility and lower interchain interaction of PTMEG2000.

Examples 1-5: Preparation of Microcellular Polyurethane Foam

Polyol components were made beforehand according to the recipes shown in Table 4 by mixing polyols, chain extenders, catalysts, surfactants, blowing agents and other additives together. The polyurethane-prepolymers synthesized in the above preparation examples were mixed with the polyol components at 50° C. and the mixture was injected into a metal mold at 50° C. using a low pressure machine (Green). Reactions between the polyol components and the prepolymers occurred instantly after the mixing, and the molded samples were demolded after being cured at 50° C. for 5 min. The post-cured polyurethane foam samples were stored for at least 24 h at room temperature before testing.

As can be seen from the recipes shown in Table 4, Example 1 and Example 2 are comparative examples comprising no ester/ether copolymer polyols according to the present disclosure. In particular, the polyol component of Example 1 and Example 2 was a blend of various polyether polyol, and the polyurethane-prepolymer component of Example 1 and Example 2 was Prepolymer-1 and Prepolymer-2, which were prepared by using polyester polyol PEBA2000 and polyether polyol PTMEG2000, respectively.

Three strategies were adopted in the Inventive Examples 3 to 5. Example 3 illustrated a specific embodiment of the present disclosure in which the polyurethane-prepolymer (Prepolymer-3) was prepared by using ester/ether random polyols, pure MDI, modified MDI, side reaction inhibitor, and the polyol component comprised polyether polyols, chain extenders, blowing agents, catalysts, foam stabilizers and other additives; namely, Example 3 only comprised the ester/ether random polyols in the polyurethane-prepolymer component. Example 4 illustrated another specific embodiment of the present disclosure in which the polyurethane-prepolymer (Prepolymer-1) was prepared by using polyester polyols, pure MDI, modified MDI, side reaction inhibitor, and the polyol component comprised ester/ether random polyol (PBPTMEA), chain extenders, blowing agents, catalysts, foam stabilizers and other additives; namely, Example 4 only comprised the ester/ether random polyols in the polyol component. Example 5 illustrated another specific embodiment of the present disclosure in which the polyurethane-prepolymer (Prepolymer-3) was prepared by using ester/ether random polyols, pure MDI, modified MDI, side reaction inhibitor, and the polyol component comprised ester/ether random polyol (PBPTMEA), chain extenders, blowing agents, catalysts, foam stabilizers and other additives; namely, Example 5 comprised the ester/ether random polyols in both the polyurethane-prepolymer component and the polyol component.

The polyurethane foams prepared in Examples 1 to 5 were formed into sample plates having a density of ca. 600 kg/m³, and the characterization results were summarized in the following Table 4.

With regard to the tear strength, it can be seen from Table 4 that the samples prepared in Examples 3-5, which comprised the ester/ether random copolymer polyols according to the present disclosure in the polyurethane main chain, exhibited significantly higher values of tear strength than that of Comparative Example 1, which solely adopted traditional polyether and polyester polyols. Besides, Examples 3-5 exhibited higher thermal stabilities as characterized with TGA and DSC than that of Example 2. In other words, the samples prepared in the Inventive Examples 3-5 can achieve improved thermal stability over that of the Comparative Example 2. Finally, the Inventive Examples 3-5, which comprised the ester/ether random copolymer polyols according to the present disclosure in the polyurethane main chain, showed significantly lower internal heat build-up compared to Example 1.

Preparation and Characterization of Polyurethane Tires.

Polyurethane solid tires with a diameter of 24 inches and a molded density of 350 kg/m³ were fabricated in a customer site by using the samples obtained in the above Examples 1 to 5 and characterized by rolling test to evaluate the comprehensive performances thereof. The rolling test was conducted with a line speed of 30 km/h, 65 kg load and two 10-mm high obstacles and lasted for 1 h at room temperature. The testing conditions and characterization results were summarized in Table 5.

TABLE 4

Formulations and Characterization of Examples 1 to 6

| | Chemicals | Example 1 (Comparative) | Example 2 (Comparative) | Example 3 (Inventive) | Example 4 (Inventive) | Example 5 (Inventive) |
|---|---|---|---|---|---|---|
| Polyols | PTMEG2000 | 22.00 | 22.00 | 22.00 | | |
| | DNC 701 | 22.40 | 22.40 | 22.40 | | |
| | CP 6001 | 42.19 | 42.19 | 42.19 | | |
| | PBPTMEA | | | | 86.57 | 86.57 |
| Chain Extender | BDO | 11.90 | 11.90 | 11.90 | 10.50 | 10.50 |
| | DEOA | | | | 1.00 | 1.00 |
| Catalyst & surfactant & blowing agent & additive | Dabco 33s | 0.25 | 0.25 | 0.25 | 0.50 | 0.50 |
| | Niax A-1 | 0.15 | 0.15 | 0.15 | | |
| | Polycat 77 | 0.45 | 0.45 | 0.45 | | |
| | Dabco DC-1 | 0.04 | 0.04 | 0.04 | 0.03 | 0.03 |
| | Tegostab B-8408 | 0.10 | 0.10 | 0.10 | | |
| | Dabco DC 193 | | | | 0.30 | 0.30 |
| | Fomrez UL 38 | 0.03 | 0.03 | 0.03 | 0.03 | 0.03 |
| | Lithene N4-9000 | 0.80 | 0.80 | 0.80 | 0.80 | 0.80 |
| | Water | 0.30 | 0.30 | 0.30 | 0.30 | 0.30 |
| Prepolymer | Prepolymer-1 | 76.61 | | | 87.40 | |
| | Prepolymer-2 | | 76.37 | | | |
| | Prepolymer-3 | | | 76.00 | | 87.10 |
| Condition | $Mol_{NCO}/Mol_{OH}$ | 1.00 | 1.00 | 1.00 | 1.00 | 1.00 |
| | Temperature (° C.) | 50.00 | 50.00 | 50.00 | 50.00 | 50.00 |
| Composition | Ester content (wt %) | 16.08 | 0.00 | 8.00 | 40.70 | 32.41 |
| | PTMEG content (wt %) | 12.41 | 28.48 | 20.46 | 24.08 | 32.41 |
| Property | Molded Density (kg/m³) | 600.00 | 600.00 | 600.00 | 600.00 | 600.00 |
| | Hardness (Asker C) | 79 | 81 | 80 | 80 | 75 |
| | Tensile Strength (kgf/cm²) | 42 | 49 | 36 | 24 | 25 |
| | Elongation (%) | 220 | 254 | 257 | 187 | 255 |
| | Tear Strength (N/cm) | 205 | 270 | 260 | 220 | 220 |
| | Thermal Stability[a] | moderate | bad | moderate | excellent | excellent |
| | Internal heat buildup[b] | bad | excellent | excellent | excellent | excellent |

Notes:
[a]The thermal stability was measured by using the TGA and DSC; and
[b]The internal heat buildup was characterized by DMA.

TABLE 5

Rolling test results of the soil tires prepared with the materials of Example 1-5.

Figure 1:
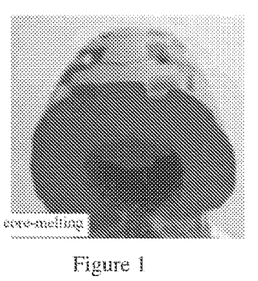
FIG. 1-2 show the photographs of polyurethane solid tires prepared by using materials with no ester/ether random copolymer polyol.
Figure 2:
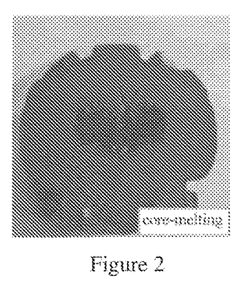
Figure 3:
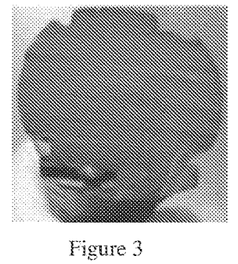
FIG. 3-5 show the photographs of polyurethane solid tires prepared by embodiments according to the present disclosure.
Figure 4:
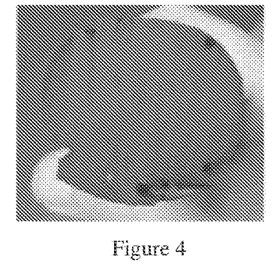
Figure 5:
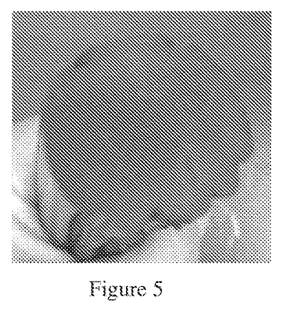

| Items | Example 1 (Comparative) | Example 2 (Comparative) | Example 3 (Inventive) | Example 4 (Inventive) | Example 5 (Inventive) |
| --- | --- | --- | --- | --- | --- |
| Line Speed (km/h) | 30 | 30 | 30 | 30 | 30 |
| Load (kg) | 65 | 65 | 65 | 65 | 65 |
| Obstacles (sets) | 2 | 2 | 2 | 2 | 2 |
| Obstacle Height (mm) | 10 | 10 | 10 | 10 | 10 |
| Rolling Time (h) | 1 | 1 | 1 | 1 | 1 |
| Impacts Times | 25,150 | 25,150 | 25,150 | 25,150 | 25,150 |
| Results | Failed (Molten) FIG. 1 | Failed (Molten) FIG. 2 | Passed FIG. 3 | Passed FIG. 4 | Passed FIG. 5 |

The tire samples prepared by using the polyurethane foams of Example 1 and Example 2 showed molten cores after the rolling tests. Core-melting of Example 1 could be attributed to the high internal heat buildup inclination as indicated by the high value of hysteresis. Core-melting of Example 2 could be attributed to the poor thermal stability at high temperatures as indicated by the TGA results. The tire samples prepared by using the polyurethane foams of Inventive Examples 3-5 passed the rolling tests due to good performance balance among tear strength, internal heat buildup and thermal stability at high temperatures.

CONCLUSIONS

In view of the above, the ester/ether random copolymer polyols imparted excellent processing and storage stability of the urethane system and outstanding performance balance among high tear strength, high abrasion resistance, low internal heat buildup and high thermal-stability of the final polyurethane material, favoring production of microcellular parts and useful in lots of relevant applications like solid tires.

What is claimed is:

1. A polyurethane composition, comprising
(A) at least one polyurethane-prepolymer prepared by reacting at least one polyisocyanate compound with a first polyol component; and
(B) a second polyol component; wherein:
at least one of the first polyol component and the second polyol component comprises an ester/ether random copolymer polyol synthesized by reacting a starting material polyether polyol with at least one monomeric polyhydric alcohol comprising from 2 to 12 carbon atoms and having a hydroxyl functionality of 1.5-3.0 and at least one monomeric multifunctional carboxylic acid or anhydride thereof comprising from 2 to 20 carbon atoms and having a carboxylic acid functionality of 1.5-3.0, and wherein:
the ester/ether random copolymer polyol is selected from a polyethylene polytetramethylene ether adipate and a polybutylene polytetramethylene ether adipate, and
the ester/ether random copolymer polyol has a number average molecular weight of 800 to 6,000 g/mol, an average hydroxyl functionality of 1.5 to 3.0, and a weight ratio between an ether segment and an ester segment in the ester/ether random copolymer polyol is from 0.05/0.95 to 0.95/0.05.

2. The polyurethane composition according to claim 1, wherein the polyisocyanate compound is selected from the group consisting of $C_4$-$C_{12}$ aliphatic polyisocyanate comprising at least two isocyanate groups, $C_6$-$C_{15}$ cycloaliphatic or aromatic polyisocyanate comprising at least two isocyanate groups, $C_7$-$C_{15}$ araliphatic polyisocyanate comprising at least two isocyanate groups, and any combinations thereof.

3. The polyurethane composition according to claim 1, wherein at least one of the first polyol component and the second polyol component comprises a polyol other than the ester/ether random copolymer polyol, selecting from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 3,000 and an average hydroxyl functionality of 1.5 to 5.0, a polymer polyol having a core phase and a shell phase based on polyol, having a solid content of 1-50%, an OH value 10~149, and a hydroxyl functionality of 1.5-5.0, a supplemental polyether polyol, and combinations thereof; wherein the supplemental polyether polyol is identical with or different from the starting material polyether polyol.

4. A microcellular polyurethane foam prepared with the polyurethane composition according to claim 1, wherein repeating units derived from the ester/ether random copolymer polyol are covalently linked in polyurethane main chain of the polyurethane microcellular polyurethane foam, and the microcellular polyurethane foam has a density of 100-900 kg/m$^3$.

5. A molded product prepared with the microcellular polyurethane foam according to claim 4, wherein the molded product is selected from the group consisting of tire, footwear, sole, furniture, pillow, cushion, toy and lining.

6. A method for preparing the microcellular polyurethane foam according to claim 4, comprising the steps of:
i) reacting at least one polyisocyanate compound with a first polyol component to form the polyurethane-prepolymer; and
ii) reacting the polyurethane-prepolymer with the second polyol component to form the microcellular polyurethane foam;
wherein repeating units derived from the ester/ether random copolymer polyol are covalently linked in polyurethane main chain of the polyurethane microcellular polyurethane foam.

7. The polyurethane composition according to claim 1, wherein the number average molecular weight of the ester/ether random copolymer polyol is from 1,500 to 2,500 g/mol.

8. A molded product prepared with the microcellular polyurethane foam according to claim 4, wherein the molded product is a tire.

9. The molded product of claim 8, wherein the tire has an internal volume of 0.1 cubic meter or more.

* * * * *